April 7, 1942. R. E. IRWIN 2,279,254
FLUID DENSITY MEASUREMENT
Filed Nov. 16, 1938 2 Sheets-Sheet 1

Inventor
Roy E. Irwin
By Amos, Thiess, Olson & Mecklenburg
Attys.

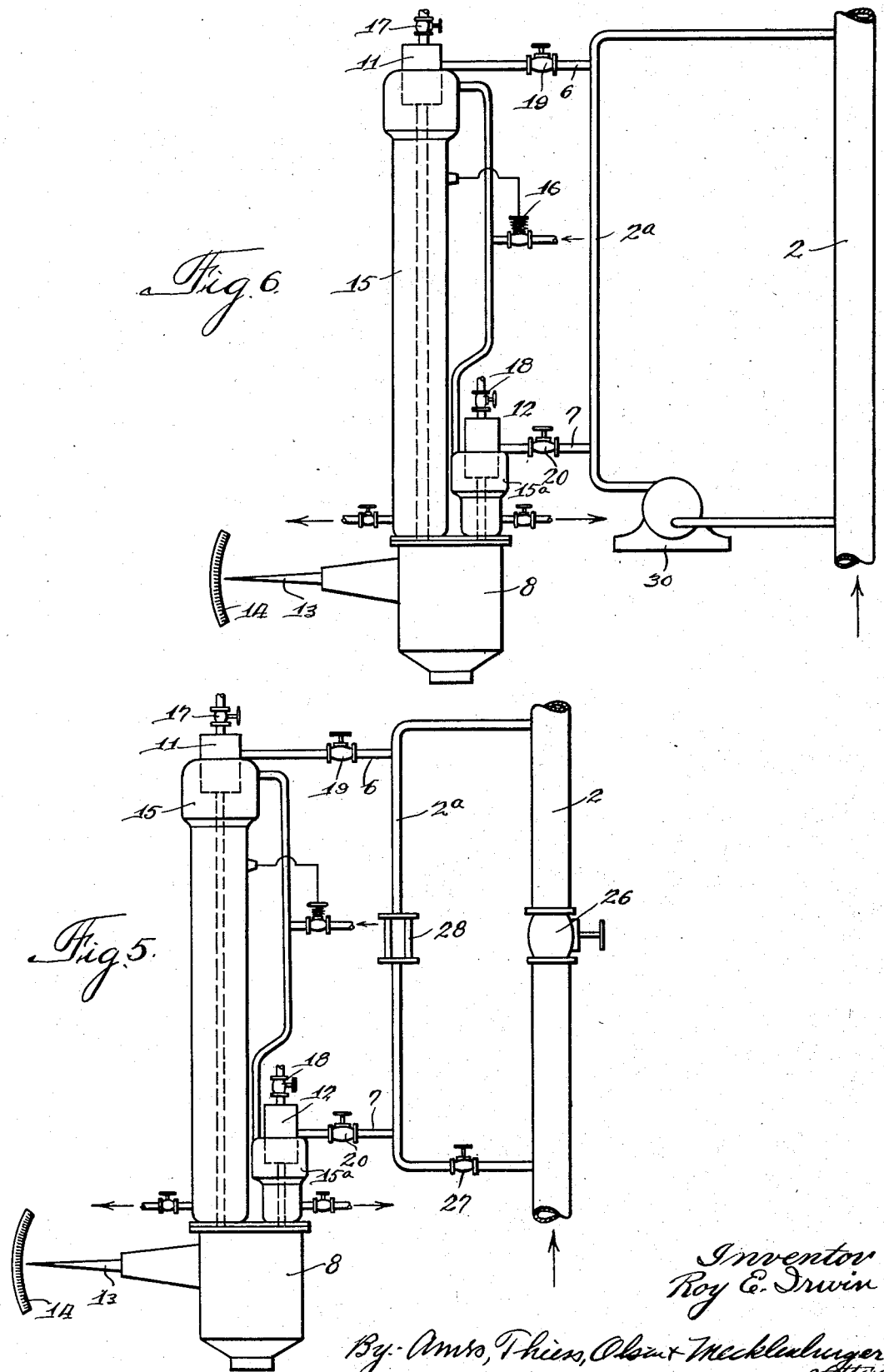

Patented Apr. 7, 1942

2,279,254

UNITED STATES PATENT OFFICE 2,279,254

FLUID DENSITY MEASUREMENT

Roy E. Irwin, Toronto, Ontario, Canada, assignor to The British American Oil Company, Ltd., Toronto, Ontario, Canada, a corporation of Canada Application November 16, 1938, Serial No. 240,599½

4 Claims. (Cl. 265—44)

The present invention relates generally to an apparatus for determining the properties of a fluid, and more particularly to an apparatus for continuously determining the in situ density or specific volume of a flowing fluid undergoing a change or conversion.

In the processing of flowing fluids, it is frequently desirable for control purposes to have a continuous record or indication of the in situ density or specific volume of the fluid, without withdrawing a sample and determining its properties by means of a hydrometer, Westphal balance, or other laboratory methods applicable to withdrawn samples. The periodic determination of density or specific volume of a withdrawn sample is a difficult and expensive operation in any case, and of little or no value as far as indicating the corresponding property of the fluid in its flowing condition, especially when dealing with fluids at temperatures and pressures which are materially different from atmospheric conditions. In addition, such cold sampling procedures are not applicable for the determination of the in situ properties of fluid mixtures which are not stable at atmospheric conditions. Thus, the mixture may be rapidly undergoing a change or conversion with the result that the character of the analyzed sample would materially differ from that of the sample at the instant of its withdrawal. Likewise, the fluid in its flowing state might comprise a mixture of gas vapor and liquid, in which case the analysis of a withdrawn sample would fail to indicate the density or specific volume of the fluid under the conditions obtaining in the flowing stream. For these and other reasons, it is highly desirable to employ an apparatus which is capable of reflecting the in situ density or specific volume of the flowing fluid stream, and thereby afford a continuous indication or record of the fluid properties under actual flowing conditions.

One of the objects of the present invention is to provide an apparatus for determining the in situ density or specific volume of a fluid under flowing conditions.

Another object is to provide an apparatus for determining the in situ properties of a fluid undergoing a change or conversion while flowing in the form of a stream.

Another object is an apparatus for determining the in situ density or specific volume of a flowing fluid, which is applicable not only to liquids or gases or vapors, but also to mixtures thereof.

The foregoing objects may be accomplished in accordance with the present invention, one aspect of which includes an apparatus which continuously compares the weight per unit area of a vertical column of a fluid, the density or specific volume of which is to be determined, with the weight per unit area of a column of a standard fluid of known density or specific gravity.

In order more clearly to disclose the nature of the present invention, reference is made to the accompanying drawings wherein several illustrative forms of the apparatus contemplated by the present invention are diagrammatically shown. It should be understood, however, that the present invention is by no means restricted to the embodiment hereinafter more particularly described, the drawings being merely illustrative of the principles involved.

Referring generally to the drawings,

Fig. 5 is a front elevation of a modified form of the invention wherein a portion of the flowing fluid is by-passed around an adjustable orifice.

Fig. 6 is a further modified form of the invention wherein a small auxiliary pump is used to by-pass a portion of the fluid through the density-responsive instrumentality.

Figure 1:
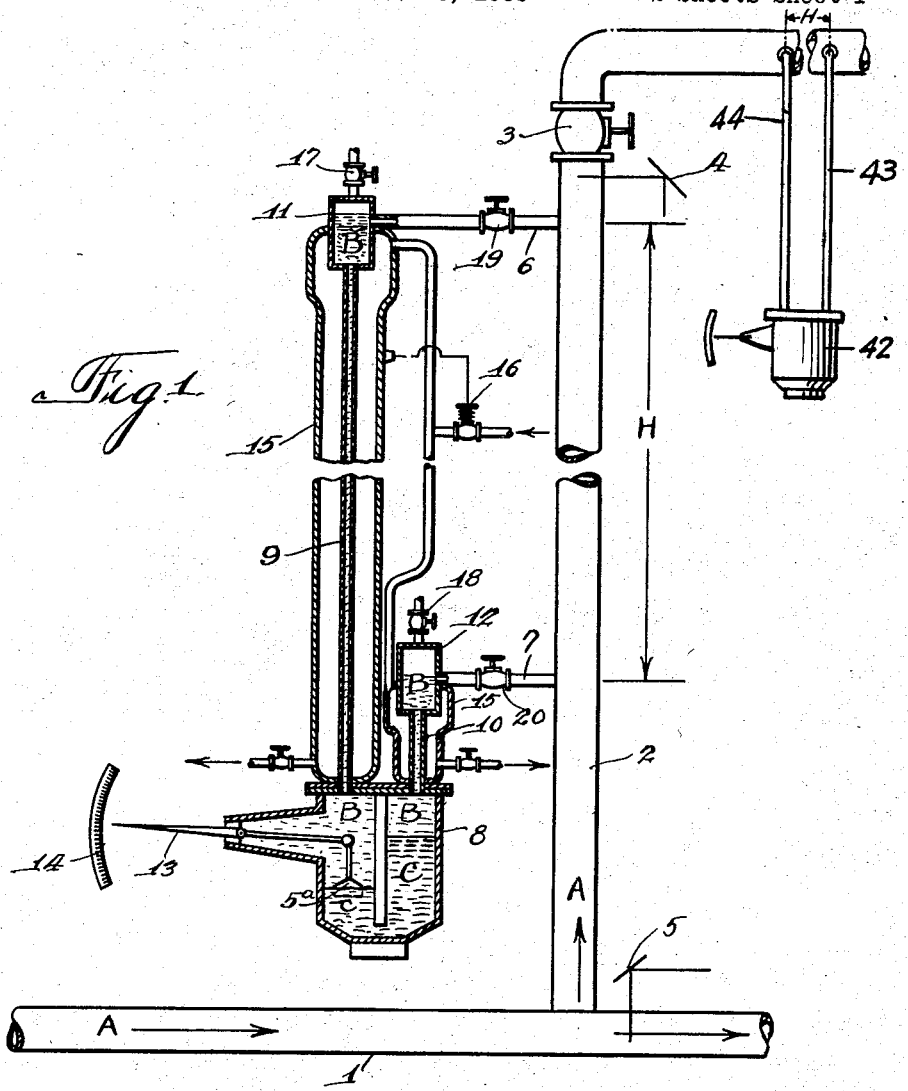
Figure 1 is a sectional elevation of a simple form of apparatus in accordance with the present invention.

Referring now generally to Fig. 1 illustrating a preferred embodiment of the present invention, the main stream of a fluid A is pumped or flows through conduit 1 on which column 2 is shown as a vertical conduit through which a portion of fluid A flows at a rate controlled by outlet valve 3. The fluid passing from valve 3 may be passed to waste, or returned to the process at any suitable point as desired. The rate of flow through column 2 is sufficient to maintain the fluid A at a thermocouple 4 at approximately the same temperature as that indicated at thermocouple 5, located in the main fluid conduit 1. The velocity of flow through conduit 2 is maintained approximately constant by adjustment of valve 3 and at a sufficiently low rate to avoid friction loss and the development of a substantial pressure differential between tap-off connecting lines 6 and 7.

The opposite legs of a U-tube or manometer 8 containing a sealing fluid C are connected by conduits 9 and 10 to the tap-off connections 6 and 7, a sealing means 11 and 12 being interposed between the conduits 9 and 10 and the tap-off lines 6 and 7, if desired. The conduits 9 and 10 are filled with a reference or standard fluid B, which has a known density or specific gravity, and which is preferably immiscible with the fluid A under the conditions prevailing in column 2. A static head of fluid B is exerted on both sides of the U-tube or manometer 8, above the sealing fluid C, such as mercury, for example. The position of the indicator arm 13 with reference to a scale 14 is determined by the float 5a, which rises and falls as the level of the sealing fluid changes in one leg of the manometer or U-tube.

Where it is desired to determine density as distinguished from specific gravity, it is necessary to maintain the reference fluid B at a substantially constant temperature. To this end, the connecting lines 9 and 10 to the manometer 8 are maintained in a heat exchange relation with a suitable medium such as fluid, for example, steam, in a jacket 15. The control of this temperature may be readily effected by control device 16, such as a temperature-responsive control device, well known, or through the agency of a constant pressure valve. If, for example, saturated steam is used as the jacketing medium, the temperature will remain constant as long as the pressure is maintained constant.

Temperature control is desirable if the reference fluid B is one which does not have a zero temperature coefficient. If, however, the reference fluid has a zero temperature co-efficient of expansion, the temperature-control means diagrammatically illustrated in the drawings may be dispensed with.

The principles involved in the foregoing apparatus may be understood from the following illustrative example: Assume that H is the effective height of columns 2 and 9; that HA is the weight per unit area in equivalent inches of water of fluid A in column 2 for the height H; and HB is the weight per unit area in equivalent inches of water of fluid B in column 9 for the height H. When venting valves 17 and 18 are open to the atmosphere and the valves 19 and 20 in the tap-off lines 6 and 7 are closed, the deflection of the column of mercury C effected by the static head of fluid B in the two legs of the manometer 8 is noted and the equivalent number of inches of water equal to this deflection may be determined. When vent valves 17 and 18 are closed and valves 19 and 20 are opened, the difference in the relationship of the fluids in columns 2 and 9 is also noted, and this may be expressed in terms of inches of water or per cent of total scale deflection on scale 14 by pointer 13. The density of fluid A is equal to the product of the density of fluid B and the ratio of HA to HB, or the per cent of total differential.

It will thus be seen that as the density of the fluid A changes, the relative position of indicator arm 13 with reference to scale 14 will correspondingly change, thereby affording a continuous indication of any variation in the in situ density of the flowing fluid.

Figure 2:
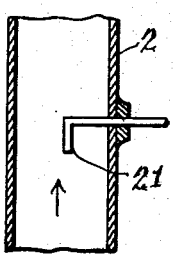
Fig. 2 is an enlarged sectional elevation showing a side view of a modified form of nipple.
Figure 3:
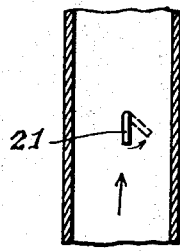
Fig. 3 is an enlarged sectional elevation showing an end view of the modified nipple of Fig. 2 in a changed position.

In Figs. 2 and 3 is shown a modified form of nipple which may be used at the upper connection to compensate for pressure drop due to friction loss if the rate of flow of the fluid through column 2 is too great. In general, the pressure drop can be minimized to a substantial degree by controlling the rate of flow of the fluid therethrough and by employing a large diameter conduit for column 2. The modified form of nipple shown in Figs. 2 and 3 may also be employed to this end, either with or without the use of a large diameter conduit. As shown in Fig. 2, the head 21 of the nipple is bent to receive part of the velocity head. This velocity head varies substantially as the square of the velocity of flow, and the friction loss varies accordingly. It will therefore be seen that as the velocity of flow increases, giving a greater pressure drop between the connections, the pressure at the upper connection would likewise increase, thereby compensating for this increase in pressure drop. As shown in Fig. 3, this nipple may be adjusted so that the increase in velocity head may be made to correspond exactly to the increase in pressure drop. With the nipple 21 pointing upstream, full velocity head will of course be attained. If, however, the nipple is rotated, the per cent of velocity head would be decreased so that at 90° there would be substantially no velocity head impressed on the other connection. By flowing a fluid of constant density through the pipe, but at different velocities, the nipple may be adjusted so that regardless of such change in velocity the recording or indicating arm 13 remains at the correct reading. In this manner variations caused by friction loss may be overcome.

Figure 4:
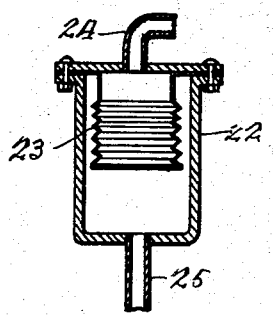
Fig. 4 is a sectional elevation of a modified form of sealing pot.

Fig. 4 illustrates a modified form of sealing pot 22, which permits the use of a reference fluid that is miscible with the fluid whose density is to be determined. The sealing pot includes a bellows 23 which expands and contracts as the static head in column 2 varies with a change in density of the flowing fluid. Fluid A enters through conduit 24, while fluid B flows in and out through conduit 25 as the density of A changes.

Fig. 5 shows a modified form of the apparatus which may be used where the main stream is conducted through a vertical pipe 2 at a velocity which, however, is too great to give accurate readings because of friction loss. According to this alternative showing, the portion of the main vertical stream is by-passed around an adjustable orifice 26 in the main vertical conduit 2. The adjustable orifice is positioned to give a sufficient pressure drop across a restriction so that the fluid will be caused to flow through the by-pass 2a at a rate adjusted by means of the valve 27. The flow of the fluid through the by-pass 2a is indicated by a flow indicator 28, which serves as a basis for resetting the valve 27 when the rate of flow in the by-pass 2a varies from a predetermined flow. The other parts of the apparatus are substantially the same as those shown in Fig. 1.

Fig. 6 shows a further modified form of apparatus which may be used where the main stream is conducted through a vertical conduit and the velocity of flow therethrough is too high. In this form of the apparatus, instead of using an adjustable orifice or valve in the main vertical conduit, a small auxiliary pump 30 is inserted in the by-pass 2a to maintain the desired rate of flow in the by-pass constant. The by-pass conduit 2a corresponds to the vertical conduit 2 of Fig. 1. The other parts of the apparatus correspond to those shown in Fig. 1.

The apparatus described in the foregoing permits the continuous indication of changes in the in situ density or specific volume of the fluid flowing through the vertical conduit. Inasmuch as the temperature of the main stream is substantially the same as that of the outlet of the vertical conduit, the in situ density of the main stream will substantially equal that in the vertical conduit. It will thus be seen that the apparatus provides a simple means of determining the in situ properties of a flowing fluid regardless of whether or not the main fluid conduit is vertical or horizontal or in any given plane.

In the foregoing detailed description it is apparent that many variations may be made without departing from the spirit and scope of the invention. Thus, for example, as an alternative method of compensating for pressure drop where the main fluid stream velocity is relatively high, two meters may be employed, one being responsive to pipe friction drop compensating a second meter which is responsive not only to pipe friction drop, but also to the density or specific volume of the fluid. In this manner the pipe friction drop may be cancelled out. Such a system of compensation is diagrammatically shown in Fig. 1 wherein the manometer 42 is connected to the horizontal outlet conduit by connecting lines 43 and 44, which are tapped into said horizontal conduit by a distance equal to H. The pressure drop (if any) indicated by meter 42 will, of course, indicate pipe friction loss over the distance H, and since the meter 8 and its associated parts indicates the total differential pressure due both to pipe friction loss over the distance H plus that due to the density of the flowing fluid, the second meter 42 provides the necessary information for correcting for any pipe friction losses. Many other variations in detail will be apparent to those skilled in the art. I therefore intend to be restricted only in accordance with the following claims.

I claim:

1. The combination with a vertical conduit for conducting a flowing fluid, the density of which is to be indicated of a U-tube containing a sealing liquid, conduits connecting opposite legs of the U-tube to vertically spaced points in said vertical conduit, a reference fluid in said connecting conduits, indicating means positioned by and with the sealing liquid in one leg of said U-tube, and means for maintaining said reference fluid at a substantially constant temperature.

2. The combination with a vertical conduit for conducting a flowing fluid, the density of which is to be indicated, of a U-tube containing a sealing liquid, conduits connecting opposite legs of the U-tube to vertically spaced points in said vertical conduit, means for preventing the fluid in said vertical conduit from entering said U-tube, a reference fluid in said connecting conduits, indicating means positioned by the height of the sealing liquid in one leg of said U-tube, and means for controlling the temperature of the reference fluid.

3. The combination of claim 2 wherein said temperature control means comprises a heat exchange medium whereby the temperature of the reference fluid may be maintained substantially constant.

4. The combination of claim 2 wherein said means for preventing the fluid in the vertical conduit from entering the U-tube comprises a sealing pot.

ROY E. IRWIN.